Dec. 31, 1940. D. W. JONES 2,226,975
RACK FOR MAGAZINES AND OTHER ARTICLES
Filed Feb. 8, 1939
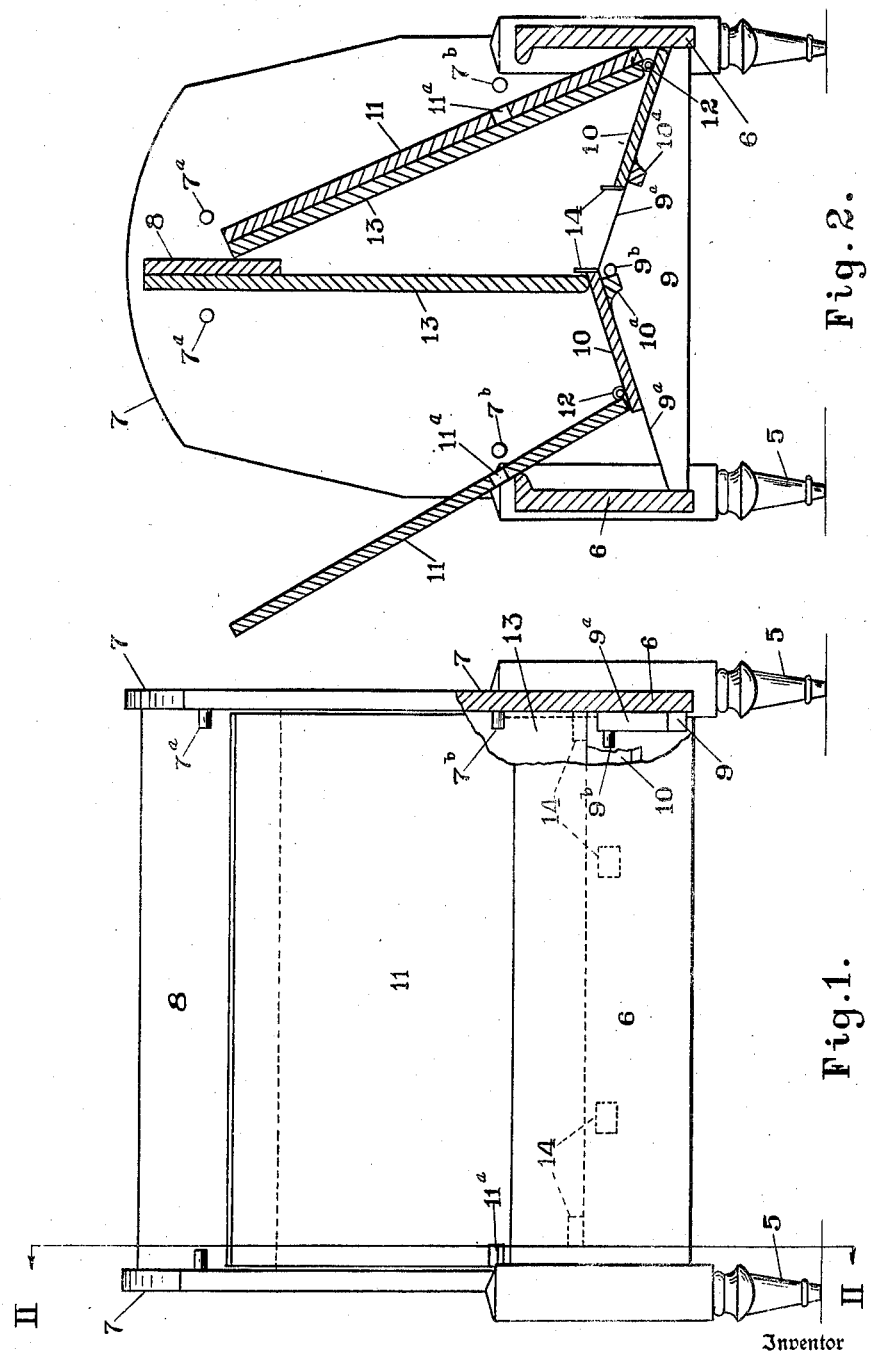
Inventor
DAVID W. JONES
By
Attorneys Patented Dec. 31, 1940

2,226,975

UNITED STATES PATENT OFFICE 2,226,975

RACK FOR MAGAZINES AND OTHER ARTICLES

David W. Jones, Columbus, Ohio

Application February 8, 1939, Serial No. 255,189

5 Claims. (Cl. 45—64)

This invention relates to racks for storing magazines and other articles such for example as sheet music, pictures, and other flat pieces and has for its principal object to provide an improved simple and economical construction of such furniture whereby the inclosing members thereof keep the contents compacted and can be manipulated and moved to permit ready examination or removal of any of the contents when desired. Other purposes of the invention will appear from the disclosure herein.

The invention is embodied in the preferred example herein shown and described, the feature of novelty being finally claimed.

In the accompanying drawing:

Figure 1 is an elevation of one side of the rack with portions broken out to show some details; and Fig. 2 is a transverse vertical sectional view on the line II—II looking to the left.

The frame or stationary part of the rack includes four legs or posts 5 between which are secured similar side rails 6 and similar end boards 7. The said end boards are secured together and braced at the top by a longitudinal board 8 which in operation affords a rest for the upper margin of each of the inner boards hereinafter referred to. The upper portion of each of end boards 7 is provided with fixed stop pegs 7ª, 7ª, equally spaced as shown from the connecting board or beam 8, and said end boards 7 are also provided with stop pegs 7ᵇ, 7ᵇ, located correspondingly near the four connections of the side rails with the said end boards. The purpose of these stops will be hereinafter explained. Secured across the lower portions of the end boards 7 are pentagonal or V-shaped pieces 9 each presenting surfaces 9ª inclined from the apex thereof downward toward the rail 6. Each of said pieces 9 is provided near its apex with stop or peg 9ᵇ for purpose to be hereinafter explained.

At each side of the longitudinal vertical middle plane of the stationary part of the frame, the construction is substantially similar and as the movable parts installed in the frame at opposite sides thereof and now to be described are substantially similar a description of one will suffice for both.

The container for the articles to be stored includes a bottom member or board 10 having hinged at 12 to the outer edge thereof, an outer closing member or board 11. In fully opened position said closing board 11 rests on the side rail 6. The bottom board 10 is supported at its opposite ends on the parallel inclined surfaces 9ª and can be slid inward or outward by appropriate transverse oscillation of the closing board 11. The inward movement of the bottom board 10 is limited by the lugs 10ª fixed on the lower side thereof contacting with the stop pegs 9ᵇ.

The closing board 11 is provided with a notch 11ª in each of its ends so positioned that said board cannot be swung to closing position until the bottom board 10 is slid downward to near the junction of the incline 9ª with the side rail 6 and where the notches 11ª can move in an arc containing the pegs 7ᵇ. The stops 7ᵇ serve as a temporary fulcrum for the outer closing member 11 in initially moving the bottom member in the closing movement of the outer member.

The character 13 designates an inner closing member or board it being inserted between the frame ends connecting member 8 and stop pins 7ª, said pins 7ª being spaced from the connecting board 8 to allow free movement of the board 13. Said inner closing board 13 has its lower edge rounded where it rests on the bottom board and can slide on said bottom board especially when somewhat drawn out at its lower margin to the extent permitted by the content if any between the boards 11 and 13 as depicted at the right hand side of Fig. 2. The board 13 is supported at its upper edge in all its inclined positions by the frame ends connecting board 8.

The inner edge of the bottom board is provided with one or more upwardly extended narrow flat lugs 14 of sheet metal that can engage the inner side of lower margin of the inner closing board 13 so that when the outer board 11 is swung toward closing position, the said inner board 13 is drawn by said lugs 14 at its lower edge toward the outer closing board 11. The result of this operation is that inner and outer boards are brought into substantially parallel position whether the pack between them be thick, thin or nil, this being due to the weight of the freely movable board 13 and the contents if any.

By obvious omission or modification, the rack can be made as single instead of double as shown, and where the rack is made double, the lugs 14 on the bottom boards can, if necessary, be in staggered location so as not to abut against each other if both outer boards are fully opened.

By reason of the construction described the magazines or sheets between the boards are kept flat, compacted and smooth; and when closed the pack is protected from the deposit of dust. But if desired a cover, not shown, can be attached to the end boards. When the inner board is swung out by operation of the lug 14 said board is drawn into better position to slide by gravity down on the inclines on which it rests and into contact with the lower end of the pack of magazines or sheets between the boards. In the open position of the boards the magazines or sheets can be examined and picked out at will. When a magazine is added to the contents of the container while in exposed position the added one, upon the closing movement the outer board crowds the pack, and the inner board thereupon, being released, permits the added magazine to drop to resting positon on the bottom board.

It is obvious that the structure shown or parts thereof can be made of any suitable material other than wood such, for example, as metal or hardened plastic material and it is not intended that my claims shall be limited to either the material or the forms or number of parts herein shown and described.

What I claim is:

1. A rack of the class described including a frame having spaced end walls with a beam connecting the upper ends thereof, stops in said end walls spaced from said connecting beam, side rails connecting the lower portions of said end walls and said end walls provided with downwardly and outwardly inclined guides, a container installed in said frame including a bottom member slidable on said inclined guides, an outer closure member movably connected with said bottom member for actuating the same, an inner closure member resting slidably on said bottom member, and means on said bottom member for actuating the inner closure member when the outer closure member is moved toward closing position.

2. A rack of the class described including a frame having spaced end walls with a beam connecting the upper portions thereof, stops in said end walls spaced from said connecting beam, side rails connecting the lower portions of said end walls, said end walls provided at their lower portions with guides inclined downwardly toward the side rails, a container installed in said frame including a bottom member slidable on said inclined guides, an outer closure member pivotally connected with said bottom member for actuating the same, an inner closure member resting slidably on said bottom member, and means on said bottom member for actuating the inner closure member when the outer closure member is moved toward closing position.

3. In a rack of the class described, a frame having parallel end walls and a connecting beam between its upper portions, said end walls also provided with parallel downwardly and outwardly inclined guides, a container between said end walls including a bottom member slidably supported on said inclined guides, an outer cover member operably connected with the outer edge of said bottom member and an inner cover member loosely and slidably resting at its lower edge on said bottom member and supported on said connecting beam at its upper portion.

4. In a rack of the class described, a frame having parallel end walls connected at their upper portions with a beam and at their lower portions by rails, downwardly and outwardly inclined guides in said frame, a container installed in said frame including a bottom member slidable on said inclined guides, an outer closure member operably connected with said bottom member for actuating the same, an inner closure member resting and movable transversely thereon, a stop means in said end walls forming a temporary fulcrum for the outer closure for causing initial outward movement of the lower edge of said bottom member upon the closing movement of the outer closing member.

5. A rack of the class described including a frame having spaced end walls and suitable means for connecting said walls, parallel downwardly and outwardly inclined guiding means on said end walls, a container installed in said frame including a bottom member slidable on said inclined guiding means, an outer closure member hingedly connected with the outer margin of said bottom member for reciprocating said bottom member on said inclined guiding means, an inner closure member loosely resting at its lower edge and transversely slidable at said edge on said bottom member, and means on said frame for limiting the movements of said inner closure member at its upper portion.

DAVID W. JONES.